United States Patent
Cepuran et al.

(10) Patent No.: US 12,283,198 B2
(45) Date of Patent: Apr. 22, 2025

(54) SYSTEMS AND METHODS FOR AUTOMATICALLY REVISING FEEDBACK IN ELECTRONIC LEARNING SYSTEMS

(71) Applicant: D2L Corporation, Kitchener (CA)

(72) Inventors: Brian Cepuran, Kitchener (CA); Jeremy Auger, Kitchener (CA); John Baker, Kitchener (CA)

(73) Assignee: D2L Corporation, Kitchener (CA)

( * ) Notice: Subject to any disclaimer, the term of this patent is extended or adjusted under 35 U.S.C. 154(b) by 174 days.

(21) Appl. No.: 17/719,665

(22) Filed: Apr. 13, 2022

(65) Prior Publication Data

US 2022/0327947 A1   Oct. 13, 2022

Related U.S. Application Data (60) Provisional application No. 63/174,089, filed on Apr. 13, 2021.

(51) Int. Cl.
| | | |
|---|---|---|
| *G09B 7/02* | (2006.01) | |
| *G06F 40/166* | (2020.01) | |
| *G06F 40/253* | (2020.01) | |
| *G06F 40/279* | (2020.01) | |
| *G06F 40/30* | (2020.01) | |
| *G06N 20/00* | (2019.01) | |

(52) U.S. Cl.
CPC ............. *G09B 7/02* (2013.01); *G06F 40/166* (2020.01); *G06F 40/253* (2020.01); *G06F 40/279* (2020.01); *G06F 40/30* (2020.01); *G06N 20/00* (2019.01)

(58) Field of Classification Search
CPC ........ G09B 7/02; G06N 20/00; G06F 40/253; G06F 40/279
See application file for complete search history.

(56) References Cited

U.S. PATENT DOCUMENTS

| | | | |
|---|---|---|---|
| 9,305,286 B2* | 4/2016 | Larsen | G10L 25/54 |
| 9,400,956 B2* | 7/2016 | Eggebraaten | G06N 7/01 |
| 10,095,736 B2* | 10/2018 | Bishop | G06F 16/93 |
| 10,802,820 B2* | 10/2020 | Konik | G06F 40/30 |
| 10,817,264 B1* | 10/2020 | Goodsitt | G06F 40/166 |
| 10,898,122 B2* | 1/2021 | Torres | A61B 5/4082 |

(Continued)

*Primary Examiner* — Xuan M Thai
*Assistant Examiner* — Sadaruz Zaman
(74) *Attorney, Agent, or Firm* — SMART & BIGGAR LP; Jason B. Hynes; David Morrison (57) ABSTRACT

Systems and methods for automatically revising feedback in an electronic learning system are provided. The method involves operating at least one processor to: receive feedback text data submitted by a user to evaluate another user; identify a plurality of sentiment groups in the feedback text data, each sentiment group consisting of a portion of the feedback text data associated with a common sentiment; select at least one feedback processing module to process each sentiment group, the at least one feedback processing module comprising at least one machine-learned model; for each sentiment group, process the corresponding portion of the feedback text data using the at least one machine-learned model to determine at least one suggested revision for the portion of the feedback text data; and generate a revised version of the feedback text data indicating each suggested revision for the feedback text data.

20 Claims, 4 Drawing Sheets

(56) References Cited

U.S. PATENT DOCUMENTS

| | | | |
|---|---|---|---|
| 10,938,592 B2* | 3/2021 | Carroll | G06Q 10/06398 |
| 11,373,446 B1* | 6/2022 | Beisel | G10L 25/63 |
| 11,443,140 B2* | 9/2022 | Hellman | G06F 16/40 |
| 11,494,560 B1* | 11/2022 | Meisner | G06N 20/00 |
| 11,526,808 B2* | 12/2022 | Etkin | G16H 10/60 |
| 11,533,272 B1* | 12/2022 | Sastry | G06N 20/00 |
| 11,646,110 B2* | 5/2023 | Sullivan | A61B 5/74 |
| | | | 607/45 |
| 11,651,222 B2* | 5/2023 | Harsham | H04L 51/216 |
| | | | 709/206 |
| 11,682,029 B2* | 6/2023 | Sharma | G06F 8/77 |
| | | | 705/7.29 |
| 12,020,593 B2* | 6/2024 | Rushkin | G06F 40/232 |
| 12,080,187 B1* | 9/2024 | Ferrucci | G06F 40/30 |
| 12,125,410 B1* | 10/2024 | Everest | G06F 16/951 |
| 12,125,411 B1* | 10/2024 | Hoffman | G09B 7/04 |
| 2016/0260346 A1* | 9/2016 | Lafrinere | G09B 7/02 |
| 2020/0155053 A1* | 5/2020 | Bernstein | A61B 5/163 |
| 2022/0084429 A1* | 3/2022 | Smith Lewis | G09B 5/065 |
| 2022/0406210 A1* | 12/2022 | Lopes Do Nascimento Filho | H04L 67/1095 |

\* cited by examiner

SYSTEMS AND METHODS FOR AUTOMATICALLY REVISING FEEDBACK IN ELECTRONIC LEARNING SYSTEMS

CROSS-REFERENCE TO RELATED PATENT APPLICATIONS

This application claims priority from U.S. Provisional Patent Application No. 63/174,089, filed on Apr. 13, 2021. The entire contents of U.S. Provisional Patent Application No. 63/174,089 is herein incorporated by reference for all purposes.

FIELD

The described embodiments generally relate to electronic learning systems, and in particular, to automatically revising feedback in electronic learning systems.

BACKGROUND

The following is not an admission that anything discussed below is part of the prior art or part of the common general knowledge of a person skilled in the art.

Electronic learning (also known as "e-Learning" or "eLearning") generally refers to education or learning where users engage in education related activities using computers and other computing devices. For example, users may enroll or participate in a course or program of study offered by an educational institution (e.g., a college, university or grade school) through a web interface that is accessible over the Internet. Users may receive assignments electronically, participate in group work and projects by collaborating over the Internet, and be graded based on assignments and examinations that are submitted, for example, using an electronic submission tool. Electronic learning is not limited to use by educational institutions. Electronic learning may be used in other environments, such as government and corporations. For example, employees at a regional branch office of a corporation may use electronic learning to participate in a training course offered by another office, or even a third-party provider.

Electronic learning systems may allow users to electronically submit feedback to critique, evaluate, or correct electronic submissions made by other users. For example, an electronic learning system for an educational institution may allow a teacher to electronically submit feedback regarding assignments or examinations electronically submitted by their students. However, electronic feedback may convey a different tone to recipients than intended by the user submitting feedback electronically. Furthermore, some users may provide electronic feedback that they would not otherwise express in other mediums, such as in person or verbally (e.g., more negative). As well, it may be challenging for some users to provide effective feedback in an electronic format. As a result, some users may receive electronic feedback that is ineffective, unhelpful, or even offensive.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with an aspect of this disclosure, there is provided a method for automatically revising feedback in an electronic learning system. The method involves operating at least one processor to: receive feedback text data submitted by a user of the electronic learning system to evaluate another user of the electronic learning system; identify a plurality of sentiment groups in the feedback text data, each sentiment group including a portion of the feedback text data associated with a common sentiment; select at least one feedback processing module to process each sentiment group, the at least one feedback processing module including at least one machine-learned model; for each sentiment group, process the corresponding portion of the feedback text data using the at least one machine-learned model of the selected at least one feedback processing module to determine at least one suggested revision for the portion of the feedback text data; and generate a revised version of the feedback text data indicating each suggested revision for the feedback text data.

In some embodiments, the feedback text data may be received concurrently with the user of the electronic learning system submitting a feedback submission to the electronic learning system, and the feedback text data may include at least a portion of the feedback submission.

In some embodiments, the feedback text data may be received from an external computing device, in response to a prompt displayed at the external computing device.

In some embodiments, at least two sentiment groups in the plurality of sentiment groups may include a common portion of the feedback text data.

In some embodiments, at least one sentiment group may include adjacent sentences in the feedback text data.

In some embodiments, identifying the plurality of sentiment groups may involve identifying a plurality of emotionally charged words in the feedback text data, and at least one sentiment group may include a portion of the feedback text data corresponding to at least one of the emotionally charged words.

In some embodiments, processing the corresponding portion of the feedback text data may involve: determining an emotional polarity associated with the corresponding portion of the feedback text data; and determining the at least one suggested revision based on the associated emotion.

In some embodiments, determining the emotional polarity associated with the corresponding portion of the feedback text data may involve: identifying, in the corresponding portion of the feedback text data, at least one of: capitalization, punctuation, or emotionally charged words.

In some embodiments, processing the corresponding portion of the feedback text data may involve: determining a specificity of the corresponding portion of the feedback text data; and determining the at least one suggested revision based on the specificity.

In some embodiments, the method may further involve determining an effectiveness of the revised feedback text data.

In some embodiments, processing the corresponding portion of the feedback text data may involve: retrieving previous feedback text data for the other user of the electronic learning system based on an effectiveness of the previous feedback text data; and determining the at least one suggested revision based on the previous feedback text data.

In some embodiments, processing the corresponding portion of the feedback text data may involve: retrieving previous feedback text data submitted by the user of the electronic learning system based on an effectiveness of the previous feedback text data; and determining the at least one suggested revision based on the previous feedback text data.

In some embodiments, the at least one suggested revision may be determined based on a reading complexity level of the other user of the electronic learning system.

In some embodiments, the at least one suggested revision may be determined based on a psychological profile of the other user of the electronic learning system.

In some embodiments, the feedback text data may be associated with an evaluative submission submitted by the other user of the electronic learning system, and processing the corresponding portion of the feedback text data may involve: determining the at least one suggested revision based on the evaluative submission.

In some embodiments, receiving the feedback text data may involve receiving feedback audio data and converting the feedback audio data to the feedback text data.

In accordance with an aspect of this disclosure, there is provided a non-transitory computer readable medium having instructions stored thereon executable by at least one processor to implement any of the methods herein.

In accordance with an aspect of this disclosure, there is provided a system for automatically revising feedback in an electronic learning system. The system includes: at least one processor coupled to a communication interface. The at least one processor is operable to: receive feedback text data submitted by a user of the electronic learning system to evaluate another user of the electronic learning system; identify a plurality of sentiment groups in the feedback text data, each sentiment group including a portion of the feedback text data associated with a common sentiment; select at least one feedback processing module to process each sentiment group, the at least one feedback processing module including at least one machine-learned model; for each sentiment group, process the corresponding portion of the feedback text data using the at least one machine-learned model of the selected at least one feedback processing module to determine at least one suggested revision for the portion of the feedback text data; and generate a revised version of the feedback text data indicating each suggested revision for the feedback text data.

In some embodiments, the feedback text data may be received concurrently with the user of the electronic learning system submitting a feedback submission to the electronic learning system, and the feedback text data may include at least a portion of the feedback submission.

In some embodiments, the feedback text data may be received from an external computing device, in response to a prompt displayed at the external computing device.

In some embodiments, at least two sentiment groups in the plurality of sentiment groups may include a common portion of the feedback text data.

In some embodiments, at least one sentiment group may include adjacent sentences in the feedback text data.

In some embodiments, identifying the plurality of sentiment groups may involve identifying a plurality of emotionally charged words in the feedback text data, and at least one sentiment group may include a portion of the feedback text data corresponding to at least one of the emotionally charged words.

In some embodiments, processing the corresponding portion of the feedback text data may involve: determining an emotional polarity associated with the corresponding portion of the feedback text data; and determining the at least one suggested revision based on the associated emotion.

In some embodiments, determining the emotional polarity associated with the corresponding portion of the feedback text data may involve: identifying, in the corresponding portion of the feedback text data, at least one of: capitalization, punctuation, or emotionally charged words.

In some embodiments, processing the corresponding portion of the feedback text data may involve: determining a specificity of the corresponding portion of the feedback text data; and determining the at least one suggested revision based on the specificity.

In some embodiments, the at least one processor may be further operable to determine an effectiveness of the revised feedback text data.

In some embodiments, processing the corresponding portion of the feedback text data may involve: retrieving previous feedback text data for the other user of the electronic learning system based on an effectiveness of the previous feedback text data; and determining the at least one suggested revision based on the previous feedback text data.

In some embodiments, processing the corresponding portion of the feedback text data may involve: retrieving previous feedback text data submitted by the user of the electronic learning system on an effectiveness of the previous feedback text data; and determining the at least one suggested revision based on the previous feedback text data.

In some embodiments, the at least one suggested revision may be determined based on a reading complexity level of the other user of the electronic learning system.

In some embodiments, the at least one suggested revision may be determined based on a psychological profile of the other user of the electronic learning system.

In some embodiments, the feedback text data may be associated with an evaluative submission submitted by the other user of the electronic learning system, and processing the corresponding portion of the feedback text data may involve: determining the at least one suggested revision based on the evaluative submission.

In some embodiments, receiving the feedback text data may involve receiving feedback audio data and converting the feedback audio data to the feedback text data.

BRIEF DESCRIPTION OF THE DRAWINGS

Several embodiments will be described in detail with reference to the drawings, in which.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Figure 1:
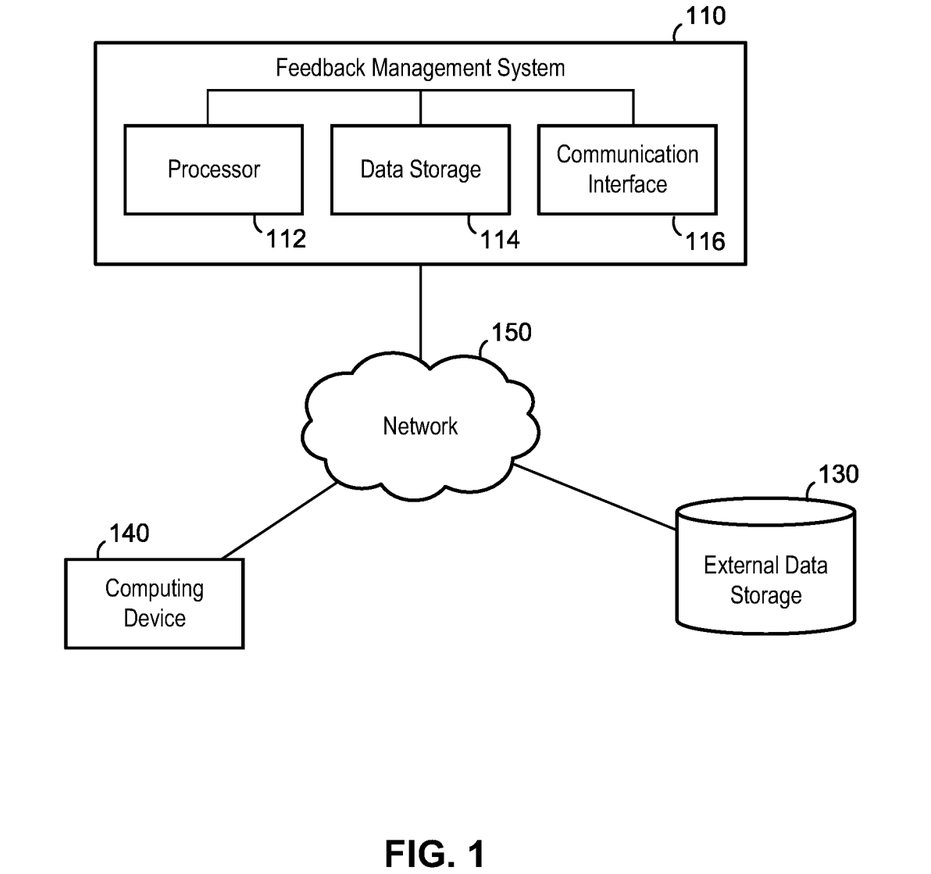
FIG. 1 is a block diagram of components interacting with an example system for automatically revising feedback text data in an electronic learning system, in accordance with an embodiment.

Referring now to FIG. 1, there is shown an example system 110 for automatically revising feedback in an electronic learning system. Generally, the feedback management system 110 can process feedback text data from an electronic learning system using artificial intelligence (AI) or machine-learned models to automatically determine suggested revisions for the feedback text data. In some embodiments, the feedback management system 110 may be integrated into an electronic learning system (not shown). In other embodiments, the feedback management system 110 may be a separate system that is in communication with an electronic learning system (not shown).

As described herein, an electronic learning system generally operates to provide various electronic learning services to users, such as through a web interface that is accessible through the Internet. Users can access the electronic learning system to participate in, create, and consume electronic learning services, including educational content, such as courses provided by an organization. For example, users may receive assignments electronically, participate in group work and projects by collaborating over the Internet, and be graded based on assignments and examinations that are submitted, for example, using an electronic submission tool.

Various feedback can be electronically submitted by users to evaluate other users in the electronic learning system. For example, teachers may electronically submit feedback data to the electronic learning system to evaluate assignment or examination answers previously electronically submitted by students. However, electronic feedback may convey a different tone to recipients than intended by the user submitting feedback electronically. Furthermore, some users may provide electronic feedback that they would not otherwise express in other mediums such as in person or verbally (e.g., more negative). As well, it may be challenging for some users to provide effective feedback in an electronic format. Unlike face-to-face or in-person feedback, it may be difficult for some users to properly convey tone, emotion, etc. in an electronic text format. As a result, some users may submit electronic feedback that is ineffective, unhelpful, or even offensive to some users. The feedback management system 110 can automatically process feedback text data in the electronic learning system to provide suggestions for revising the feedback text data. In this manner, the feedback management system 110 can improve the quality of electronic feedback in the electronic learning system, thereby improving the operation of the electronic learning system.

The feedback management system 110 can generally be implemented using hardware or a combination of hardware and software. For example, the feedback management system 110 may be implemented using an electronic tablet device, a personal computer, workstation, server, portable computer, mobile device, personal digital assistant, laptop, smart phone, WAP phone, or any combination of these. In some embodiments, the feedback management system 110 may be implemented by two or more computers distributed over a wide geographic area and connected through a network. As shown, the feedback management system 110 can include a processor 112, a data storage 114, and a communication interface 116. Each of these components may be divided into additional components or combined into fewer components. Some of the components may be distributed over a wide geographic area and connected through a network.

The processor 112 can be implemented with any suitable processor, controller, digital signal processor, graphics processing unit, application specific integrated circuits (ASICs), and/or field programmable gate arrays (FPGAs) that can provide sufficient processing power for the configuration, purposes and requirements of the feedback management system 110. The processor 112 can include more than one processor with each processor being configured to perform different dedicated tasks. The processor 112 can be configured to control the operation of the feedback management system 110. The processor 112 can execute various instructions stored in the data storage 114 to implement the various feedback revision methods described herein.

The data storage 114 can include RAM, ROM, one or more hard drives, one or more flash drives or some other suitable data storage elements such as disk drives. The data storage 114 can store instructions that can be executed by the processor 112 to implement the various feedback revision methods described herein. The data storage 114 can also store various data used or generated by the various feedback revision methods described herein. For example, the data storage 114 may store various feedback text data, machine-learned models for processing the feedback text data, or revised versions of the feedback text data. The data storage 114 may include one or more databases (not shown), such as a relational database (e.g., a SQL database), for example. The data storage 114 may be used to store an operating system that provides various basic operational processes for the processor 112.

The communication interface 116 can include any interface that enables the feedback management system 110 to communicate with various devices and other systems. The communication interface 116 can include at least one of a serial port, a parallel port or a USB port, in some embodiments. The communication interface 116 may also include an interface to a component via one or more of a Bluetooth, WIFI, Internet, Local Area Network (LAN), Ethernet, Firewire, modem, fiber, or digital subscriber line connection. Various combinations of these elements may be incorporated within the communication interface 116. For example, the communication interface 116 may receive input from various input devices, such as a mouse, a keyboard, a touch screen, a thumbwheel, a trackpad, a track-ball, a card-reader, voice recognition software and the like depending on the requirements and implementation of the feedback management system 110.

As shown, the feedback management system 110 can be in communication with various components, such as an external data storage 130, and a computing device 140, through a network 150. The network 150 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the feedback management system 110 and various components.

The external data storage 130 can store various data associated with the operation of the feedback management system 110, similar to the data storage 114. For example, various feedback text data and revised versions of feedback text data may be stored on the external data storage 130 for retrieval by the feedback management system 110 or the electronic learning system. In some embodiments, the external data storage 130 may store older, or less frequently used data as compared the data storage 114.

The computing device 140 may be any networked device operable to connect to the network 150. A networked device is a device capable of communicating with other devices through a network such as the network 150. A network device may couple to the network 150 through a wired or wireless connection. The computing device 140 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these. The computing device 140 may be operated by a user to participate in, create, or consume electronic learning services provided by the electronic learning system. In various embodiments, the computing device 140 may be operated by a user to electronically submit feedback data to the electronic learning system and receive suggested feedback revisions generated by the feedback management system 110. Although only a single computing device 140 is shown in the illustrated example, it should be appreciated that there may be any number of computing devices 140. Furthermore, although the feedback management system 110 is shown in FIG. 1 as a separate component from the computing device 140, in some embodiments, it can be combined with the computing device 140.

Figure 2:
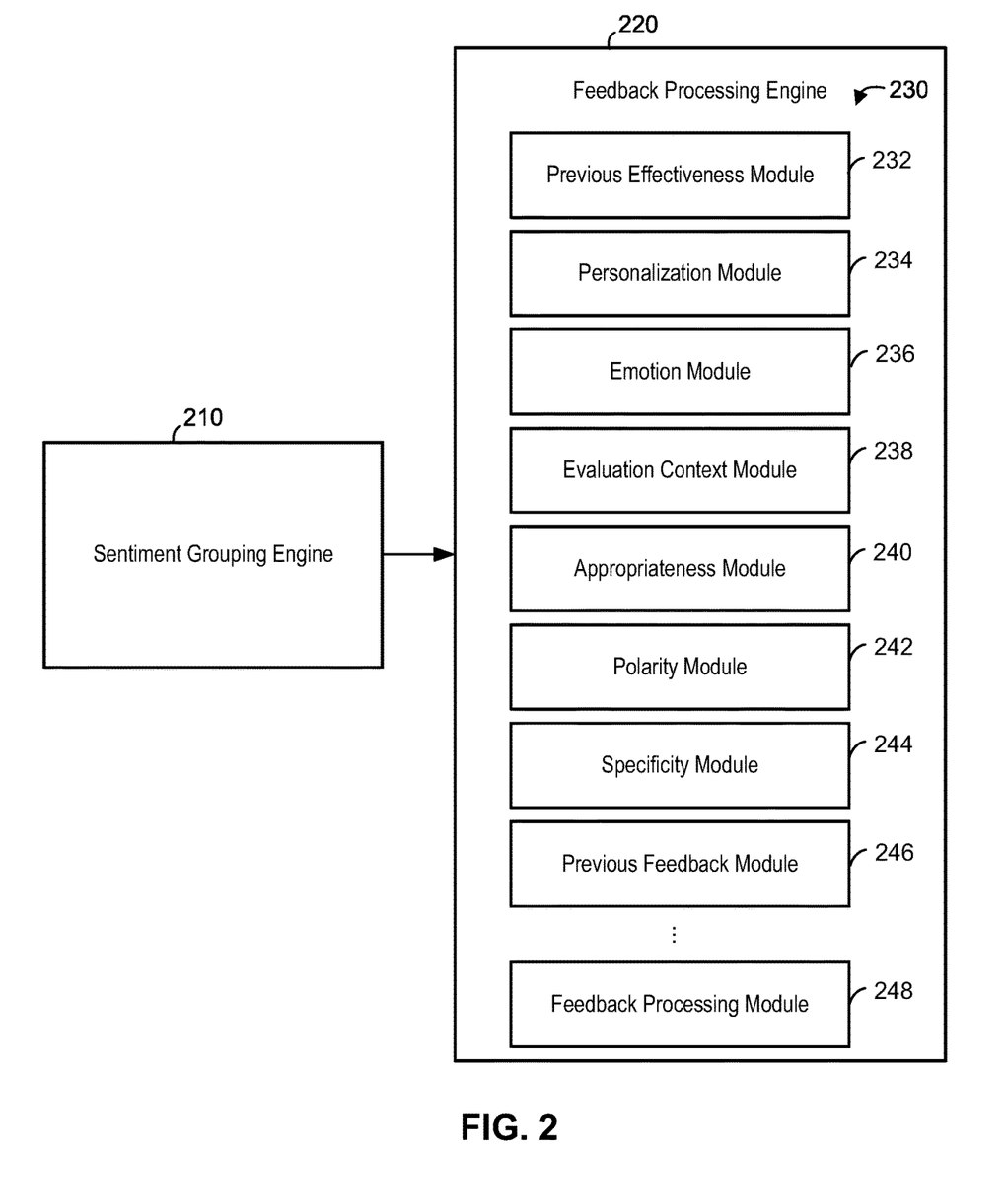
FIG. 2 is a schematic diagram of an example sentiment grouping engine and an example feedback processing engine for the feedback revision system shown in FIG. 1, in accordance with an embodiment.

Referring now to FIG. 2, there is shown an example sentiment grouping engine 210 and an example feedback processing engine 220 that can be implemented as a part of the feedback management system 110. For example, the sentiment grouping engine 210 and the feedback processing engine 220 may be implemented by instructions stored by the data storage 114 and executed by the processor 112.

The sentiment grouping engine 210 can identify sentiment groups in feedback text data from the electronic learning system. Each sentiment group consists of a portion of the feedback text data that is associated with a common sentiment. For example, each sentiment group may be associated with a particular idea, emotion, thought, feeling, etc. The sentiment groups may contain sentences, phrases, paragraphs, or other segments of the feedback text data.

Each sentiment group can then be processed by feedback processing engine 220. By identifying sentiment groups, the feedback management system 110 may be able to analyze portions of the feedback text data that may otherwise be hidden by adjacent portions of the feedback text data. For example, a sentence expressing negative feedback may be surrounded and concealed by sentences that express positive feedback (e.g., a "feedback hamburger"). The sentiment grouping engine 210 can divide the feedback text data into various sentiment groups that can each be individually processed by the feedback processing engine 220.

The sentiment grouping engine 210 may include one or more artificial intelligence (AI) or machined-learned models configured to process the feedback text data to identify the sentiment groups. The artificial intelligence (AI) or machined-learned models can be any suitable type of model that is trained to make such predictions, such as support vector machines, linear regression, logistic regression, naïve Bayes, linear discriminant analysis, decision trees, k-nearest neighbor algorithms, neural networks, similarity learning, and the like. Additionally, or alternatively, various natural language processing techniques can be used to identify the sentiment groups.

In some embodiments, the sentiment grouping engine 210 can identify sentiment groups based on emotionally charged words (i.e., "hot spots") in the feedback text data. The sentiment groups can include the portion of the feedback text data corresponding to the emotionally charged words. Additionally, or alternatively, the sentiment groups can include portions of the feedback text adjacent to the emotionally charged words. For example, the sentiment grouping engine 210 may identify a first portion of the feedback text data containing words associated with a negative sentiment (e.g., "bad", "poor", "unacceptable", etc.) as a first sentiment group, and identify a second portion of the feedback text data containing words associated with a positive sentiment (e.g., "good", "great", "excellent", etc.) as a second sentiment group.

In some embodiments, the sentiment grouping engine 210 can identify the sentiment groups based on proximity in the feedback text data. For example, the sentiment grouping engine 210 may identify adjacent, consecutive, or adjoining sentences, phrases, and/or paragraphs in the feedback text data as a sentiment group.

In some embodiments, the sentiment groups may include overlapping, shared, or common portions of the feedback text data. That is, some feedback text data may be included in more than one sentiment group. Alternatively, each sentiment group may include distinct portions of the feedback text data. That is, each portion of the feedback text data may be included in only one sentiment group.

The feedback processing engine 220 can process each of the identified sentiment groups. That is, the feedback processing engine 220 can process each of the identified portions of the feedback text data corresponding to the sentiment groups. As shown, the feedback processing engine 220 can include a plurality of feedback processing modules 230. Each feedback processing module 230 can process one or more sentiment groups to determine suggested revisions for the feedback text data.

Each feedback processing module 230 can include one or more artificial intelligence (AI) or machined-learned models configured to process the portions of the feedback text data to determine the suggested revisions. The artificial intelligence (AI) or machined-learned models can be any suitable type of model that is trained to make such predictions, such as support vector machines, linear regression, logistic regression, naïve Bayes, linear discriminant analysis, decision trees, k-nearest neighbor algorithms, neural networks, similarity learning, and the like. Each feedback processing module 230 may include different models for performing different types of processing.

In some embodiments, each feedback processing module 230 may be operable to determine whether that feedback processing module 230 is suitable to process a particular sentiment group. For example, certain feedback processing modules 230 may be configured to analyze specific types of feedback text data, specific types of users, specific types of evaluations, etc. Accordingly, not all feedback processing modules 230 may be appropriate to analyze some sentiment groups. Each feedback processing module 230 may be operable to determine the applicability of that feedback processing module 230 to process a particular sentiment group.

In the illustrated example, the feedback processing modules 230 include a previous effectiveness module 232, a personalization module 234, an emotion module 236, an evaluation context module 238, an appropriateness module 240, a polarity module 242, a specificity module 244, and a previous feedback module 246. Each of the feedback processing modules 248 may be combined into fewer modules or separated into additional modules. As shown, the feedback processing engine 220 may include other additional feedback processing modules 248.

The previous effectiveness module 232 can determine the effectiveness of previous electronic feedback in the electronic learning system given by the evaluating user or received by the evaluated user and determine suggested revisions to feedback text data based on the effectiveness of the previous electronic feedback. For example, the previous effectiveness module 232 may analyze the impact that previous electronic feedback received by the evaluated user had on the user's achievements in subsequent electronic assessments in the electronic learning system. In this analysis, the previous effectiveness module 232 may consider any response provided by the evaluated user in response to the previous feedback, including, but not limited to the type or tone of the response. In some embodiments, the evaluated user may be polled to request feedback from the user on the previous feedback. For example, a user interface may be displayed to the evaluated user to request a rating of the feedback received. Similarly, the previous effectiveness module 232 may analyze the impact that previous electronic feedback given by the evaluating user had on the evaluated user's achievements in subsequent electronic assessments in the electronic learning system. The previous effectiveness module 232 can then determine suggested revisions to feedback text data based on the impact of the previous electronic feedback, for example, by encouraging feedback that was determined to be previously effective, or by discouraging feedback that was determined to be previously ineffective. The suggested revisions generated by the previous feedback effectiveness module 232 can be stored by the feedback management system 110, for example, in association with a profile corresponding to the respective user.

The personalization module 234 can determine suggested revisions to feedback text data based on the evaluated user. For example, the personalization module 234 may retrieve data associated with the evaluated user from the electronic learning system or from other systems. The personalization module 234 can then determine suggested revisions that are customized or personalized to the evaluated user based on the retrieved data. For example, the suggested revisions may involve referencing by sports, family, environment, weather, location, religion, clubs, or any other information associated with the evaluated user.

The emotion module 236 can determine emotions expressed by feedback text data and determine suggested revisions based on the emotional context. For example, the emotion module 236 may determine feelings or emotions associated with the feedback text data, such as anger, happiness, sadness, etc. The emotion module 236 can then determine suggested revisions based on the determined emotional context, for example, suggesting using a more neutral tone for feedback that is too emotional.

In some embodiments, the emotion module 236 can determine the emotional context based on the presence of emotionally charged words in the feedback text data. For example, words like "bad", "poor", or "unacceptable" may be associated with sadness, or disappointment. In some embodiments, the emotion module 236 can determine the emotional context based on the presence of punctuation. For example, a large amount of exclamation marks may be associated with anger, surprise etc. In some embodiments, the emotion module 236 can determine the emotional context based on the presence of capitalization in the feedback text data. For example, large amounts of capitalization may be associated with anger, surprise, etc.

The evaluation context module 238 can determine the evaluation context of feedback text data and determine suggested revisions based on the evaluation context. For example, the evaluation context module 238 may determine the type of submission that the feedback text data is intended to evaluate (e.g., an assignment, a quiz, etc.). The evaluation context module 238 can then determine suggested revisions based on the type of submission. For example, the evaluation context module 238 may generate scaffolding (e.g., templates, rubrics, etc.) for feedback specific to or targeting the type of submission. The evaluation context module 238 can also determine suggested revisions to refer to a subsequent assignment (e.g., "next" assignment for feed-forward feedback).

The appropriateness module 240 can determine the appropriateness of feedback text data for the user being evaluated and determine suggested revisions based on the appropriateness. For example, the appropriateness module 240 may determine the reading complexity level of the user being evaluated. The appropriateness module 240 can then determine suggested revisions based on the determined reading complexity level, for example, to use more basic vocabulary for a user with a low reading complexity level, or to use more complex vocabulary for a user for a high reading complexity level. Additionally, or alternatively, the appropriateness module 240 may determine the psychological profile of the user being evaluated. The psychological profile may be determined by administering a test on the user, analyzing words submitted by the user, asking the user to self-identify, or a combination of these. The appropriateness module 240 can then determine suggested revisions based on the determined physiological profile, for example, to use a more requestive or directive tone, depending on compatibility with the user's psychological. In some embodiments, the psychological profile for a user may include a personality profile, such as a Myers-Briggs Type Indicator, DISC, LPMD, etc.

The polarity module 242 can determine the polarity of feedback text data and determine suggested revisions based on the polarity. For example, the polarity module 242 can determine whether feedback text data expresses an opinion that is positive, negative, neutral, etc. The polarity module 242 can then generate suggested revisions based on the determined polarity, for example, to soften feedback that is excessively positive or negative, or to sharpen feedback that is too neutral. The polarity module 242 can use various natural language processing (NLP) techniques to determine polarity.

The specificity module 244 can determine the specificity of feedback text data and determine suggested revisions based on the specificity. For example, the specificity module 244 may determine whether feedback text data provides feedback that is actionable (e.g., "capitalize proper nouns") or feedback that is generic (e.g., "this is good", "this is bad"). The specificity module 244 can then generate suggested revisions based on the determined actionability, for example, to provide more specific or actionable details for feedback that is too generic. The specificity module 244 may identify the presence of certain words (e.g., "on page 2", "on slide 2", etc.) or test for patterns of language associated with good specificity to determine the specificity level.

The previous feedback module 246 can retrieve previous feedback given to the evaluated and determine suggested revisions to feedback text data based on the previous feedback. For example, the previous feedback module 246 may incorporate the previous feedback as a part of the suggested revisions (e.g., "last time the learner was asked to focus on their vocabulary, did they listen?").

Figure 3:
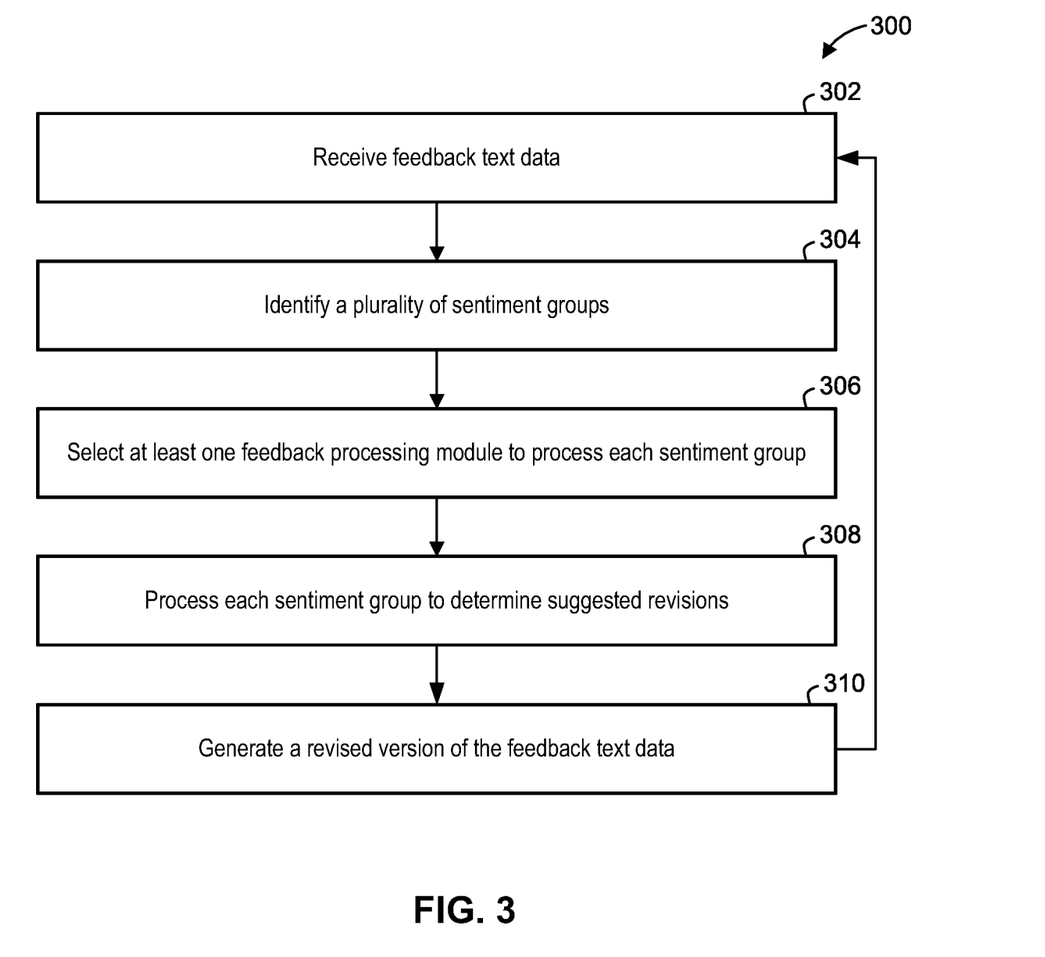
FIG. 3 is a flowchart of an example method of operating the feedback revision system shown in FIG. 1, in accordance with an embodiment.

Referring now to FIG. 3, there is shown an example method 300 of operating the feedback management system 110. For example, the method 300 may be implemented by the processor 112 executing instructions stored in the data storage 114. The feedback revision method 300 can be used to automatically revise feedback text data in an electronic learning system.

At 302, feedback text data can be received. For example, the feedback text data can be received at the processor 112, through the communication interface 116, and stored in the data storage 114. The feedback text data can be submitted by a user of the electronic learning system to evaluate another user of the electronic learning system. The feedback text data may correspond to a feedback submission in the electronic learning system. For example, the feedback text data may correspond to an electronic evaluation submitted by a teacher to evaluate an assignment or examination electronically submitted by a student in the electronic learning system. The feedback text data may be received in a variety of formats.

In some embodiments, the feedback text data may include at least a portion of a feedback submission submitted by a user of the electronic learning system. That is, the feedback text data may not include the entirety of a feedback submission. For example, the feedback text data may be received concurrently as a user of the electronic learning system submits a feedback submission to the electronic learning system. The feedback management system 110 may analyze the feedback text data in substantially real-time, prior to the entire feedback submission being received.

In some embodiments, the feedback text data can be received from an external computing device, such as the computing device 140. The external computing device may display a prompt instructing the user to submit feedback data to the electronic learning system using the computing device. For example, the external computing device may operate a mobile software application that prompts the user to submit feedback data. In this manner, the feedback management system 110 can encourage users to submit feedback data evaluating outside data sources, for example, for meetings or presentations in a corporate setting, or groupwork or in-class activities in an education setting.

In some embodiments, receiving the feedback text data may involve receiving feedback audio data. For example, the feedback management system 110 may receive feedback data in the form of audio or video files. The feedback management system 110 can convert the feedback audio data into feedback text data to receive the feedback text data. Various speech-to-text methods can be used to convert the feedback audio data.

At 304, a plurality of sentiment groups can be identified in the received feedback text data. For example, the sentiment grouping engine 210 can identify a plurality of sentiment groups in the feedback text data. Each sentiment group can consist of a portion of feedback text data that is associated with a common sentiment. The sentiment groups can be identified in various ways, including using artificial intelligence (AI) or machine-learned models to process the feedback text data. Additionally, or alternatively, various natural language processing techniques may be used. In some embodiments, the sentiment groups can be identified based on emotionally charged words in the feedback text data. In some embodiments, the sentiment groups can be identified based on adjacent sentences in the feedback text data.

In some embodiments, at least two sentiment groups may include a common portion of the feedback text data. In some embodiments, at least one sentiment group may include adjacent sentences in the feedback text data. In some embodiments, at least one sentiment group may include a portion of the feedback text data corresponding to at least one emotionally charged word.

At 306, at least one feedback processing module 230 can be selected to process each sentiment group. For example, the processor 112 can select one or more of the feedback processing modules 230 of the feedback processing engine 220. As described herein, each feedback processing module 230 can include at least one artificial intelligence (AI) or machine-learned model. Each feedback processing module 230 may include different models and be configured to perform different types of processing. For example, some feedback processing modules 230 may be configured to analyze specific types of feedback text data, specific types of users, specific types of evaluations, etc. In various embodiments, the at least one feedback processing module 230 can be selected based on the portion of the feedback text data corresponding to the sentiment group.

In some embodiments, the feedback processing modules 230 may be operable to determine whether a particular feedback processing module 230 is suitable to process a particular sentiment group. For example, each feedback processing modules 230 may be operable to determine the applicability of that feedback processing module 230 to process a particular sentiment group.

At 308, each sentiment group can be processed using the corresponding feedback processing modules 230 to determine suggested at least one suggested revision. In particular, for each sentiment group, the corresponding portion of the feedback text data can be processed using the at least one machine-learned model of the selected at least one feedback processing module 230 to determine at least one suggested revision for the portion of the feedback text data. As described herein, various types of feedback processing modules 230 can process the sentiment groups (i.e., the corresponding portion of the feedback text data).

In some embodiments, processing the corresponding portion of the feedback text data may involve determining an emotion associated with the corresponding portion of the feedback text data, and determining the at least one selected revision based on the associated emotion. For example, the emotion module 236 may identify capitalization, punctuation, and/or emotionally charged words in the feedback text data. The emotion module 236 can then determine an emotion expressed by the feedback text data and determine the at least one suggested revision based on the emotion. For instance, the emotion module 236 may suggest providing a more neutral tone when the feedback is determined to be too emotional.

In some embodiments, processing the corresponding portion of the feedback text data may involve determining a specificity of the corresponding portion of the feedback text data, and determining the at least one selected revision based on the specificity. For example, the specificity module 244 can determine an actionability of the feedback text data and determine the at least one suggested revision based on the actionability. For instance, the specificity module 244 may suggest providing more specific or actionable feedback for feedback that is determined to be too generic.

In some embodiments, processing the corresponding portion of the feedback text data may involve retrieving previous feedback text data submitted by the evaluating user and determining the at least one suggested revision based on the previous feedback text data. For example, the previous effectiveness module 232 may retrieve previous feedback data to determine the effectiveness of the previous feedback and determine the at least one suggested revision based on the determined effectiveness. For instance, the previous effectiveness module 232 may encourage feedback that was determined to be previously effective, or by discourage feedback was determined to be previously ineffective.

In some embodiments, processing the corresponding portion of the feedback text data may involve retrieving previous feedback text data submitted by evaluated user and determining the at least one suggested revision based on the previous feedback text data. For example, the previous effectiveness module 232 may retrieve previous feedback data to determine the effectiveness of the previous feedback and determine the at least one suggested revision based on the determined effectiveness. As another example, the previous feedback module 246 may retrieve previous feedback given to the evaluated user to determine the at least one suggested revision. For instance, the previous feedback module 246 may incorporate the previous feedback as a part of the suggested revision.

In some embodiments, the at least one suggested revision may be determined based on a reading complexity level of the evaluated user. In some embodiments, the at least one suggested revision may be determined based on a physiological profile of the evaluated user. For example, the appropriateness module 240 may determine the reading complexity level or physiological profile of the evaluated user and determine the at least one suggested revision based on the determined reading complexity level or physiological profile. For instance, the appropriateness module 240 may suggest adjusting the complexity of the vocabulary in the feedback based on the reading complexity level, or the tone of the feedback based on the psychological profile. For example, the appropriateness module 240 may determine that the feedback is too technical, or includes words that are too complex for the evaluated user.

In some embodiments, the at least one suggested revision may be determined based on an evaluative submission associated with feedback text data (i.e., the submission being evaluated by the feedback text data). For example, the evaluation context module 238 may determine the type of submission the feedback text data is intended to evaluate (e.g., an assignment, a quiz, etc.) and then determine the at least one suggested revision based on the type of submission. For instance, the evaluation context module 238 may provide scaffolding (e.g., templates, rubrics, etc.) specific to or targeting the type of submission. For another example, the evaluation context model 238 can provide suggested revisions that refer to a subsequent assignment (e.g., "next" assignment for feed-forward feedback).

At 310, a revised version of the feedback text data can be generated. The revised version of the feedback text data can indicate each suggested revision for the feedback text data determined by the feedback processing modules 230. For example, the processor 112 can generate the revised version of the feedback text data based on the suggested revisions generated by the feedback processing engine 220.

In some embodiments, the revised version of the feedback text data may indicate the suggested revisions using annotations (e.g., comments or corrections added to the original feedback text data). For instance, the suggested revisions may be displayed inline with the original feedback text data or as floating elements. In this manner, the suggested revisions can be displayed to the user so that the user can decide which suggested revisions to implement. Various user interface elements can be displayed to the user so that the user can select which of the suggested revisions to implement. For example, in some cases, an accept or reject revision button may be displayed to the user. An example of an annotated version of feedback text data will now be described with respect to FIG. 4.

Figure 4:
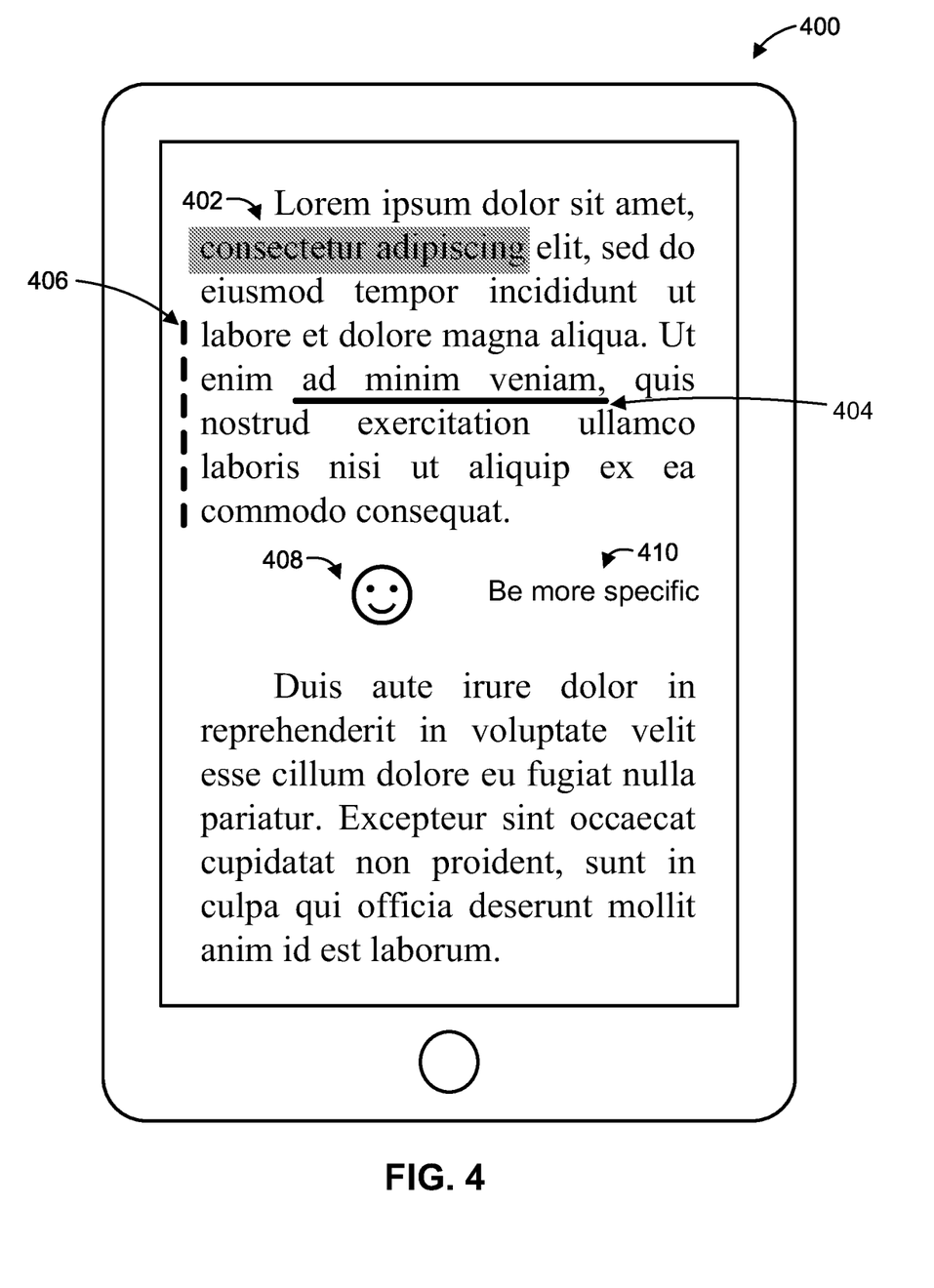
FIG. 4 is a screenshot of an example user interface displaying a revised version of feedback text data generated by the feedback revision system shown in FIG. 1, in accordance with an embodiment.

Referring to FIG. 4, there is shown an example user interface 400 that can be generated by the feedback management system 110 or the electronic learning system. As shown, the user interface 400 can display a revised version of the feedback text data indicating suggested revisions for the feedback text data. In the illustrated example, the suggested revisions are displayed in the form of annotations added to the original feedback text data. As shown, the suggested revisions may be displayed as highlighting 402, underlining 404, colouring 406, icons 408, and text 410. Various other types of annotations may be used to display the suggested revisions.

Referring back to FIG. 3, in other embodiments, the revised version of the feedback text data may indicate the suggested revisions by automatically applying the suggested versions to the original feedback text data. In this manner, the feedback text data with the suggested revisions already implemented can be displayed to the user without the user deciding to implement the suggested revisions (e.g., by "auto-correcting" the feedback text data). In some embodiments, the revised version of the feedback text data may be generated in substantially real-time with the reception of the feedback text data. In this manner, feedback text data can be an auto-corrected in substantially real-time as a user electronically inputs feedback to the electronic learning system. In various embodiments, the feedback management system 110 may permit a user to undo suggested revisions that were already applied to the original feedback text data (e.g., to revert one or more implemented revisions back to the original feedback text data).

In some embodiments, the feedback management system 110 may automatically apply a portion of the suggested revisions and indicate a portion of the suggested revisions using annotations. For example, the feedback management system 110 may automatically apply suggested revisions that are known to be commonly accepted by users. For instance, for text data converted to audio, filler words (e.g., "um", "ah", etc.) may be automatically removed. As another example, directive language may be automatically converted to requestive language.

In some embodiments, the revised version of the feedback text data may be converted into other formats. For example, when the feedback text data is initially received in the form of audio or video, the revised version of the feedback text data may be converted back into audio or video data. Various text to speech techniques can be used to convert the revised version of the feedback text data.

As shown, the feedback revision method 300 can be repeated or iterated. For example, subsequent to 310, acts 302, 304, 306, 308, and 310 can be executed one or more additional times.

In some embodiments, subsequent to 310, the feedback management system 110 can receive user-revised feedback text data. For example, a user may revise the feedback text data in response to reviewing the revised version of the feedback text data generated by the feedback management system 110 and submit the user-revised feedback text data back to the feedback management system 110. The feedback management system 110 may process the user-revised feedback text data to determine which suggested revisions were actually implemented by the user. The user-revised feedback text data can then be used to adjust or improve the sentiment grouping engine 210 or the feedback processing engine 220. For example, the user-revised feedback text data may be used to re-train the various artificial intelligence (AI) or machine-trained models. Accordingly, as more user revisions are received over time, the feedback management system 110 can be improve the automatic processing of feedback text data.

In some embodiments, the feedback management system 110 may generate alerts in response to the processing of the feedback text data. The alerts can be transmitted to various users of the electronic learning system, including the evaluating users, administrative users, supervising users, etc. For example, the feedback management system 110 may generate an alert based on triggers, such as but not limited to, when feedback text data is determined to be particularly negative, emotional, etc. In this manner, the feedback management system 110 can automatically warn one or more users when a particular evaluating user is behaving in an acceptable fashion.

Although the above examples have been described with respect to feedback text data in an electronic learning system, it should be appreciated that the feedback management system 110 may be used to automatically revise other types of data, in some embodiments. For example, the feedback management system 110 may be used to automatically analyze discussions, assignments, or other types of text submitted by users of the electronic learning system. Generally, the feedback management system 110 may be used to intermediate any communication to improve the impact of the communication. For example, the feedback management system 110 may be used to process and generate suggested revisions for email, discussion boards, feedback/grading, writing assignments, or even oral communication. Further example applications of the feedback management system 110 include human resources systems (e.g., feedback given by a manager to a subordinate employee or colleagues, irrespective of hierarchy), dating applications (e.g., communications between potential romantic partners), email clients (e.g., communications more generally), and the like.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A method for automatically revising feedback in an electronic learning system, the method comprising operating at least one processor to:
receive, from a computing device associated with a reviewer, initial feedback text data submitted by the reviewer to evaluate electronic input submitted by a learner, the reviewer and the learner being users of the electronic learning system, the electronic input comprising an evaluative submission;
divide the initial feedback text data submitted by the reviewer into a plurality of portions;
detect a sentiment associated with each portion of the initial feedback text data submitted by the reviewer;
identify a plurality of sentiment groups in the initial feedback text data submitted by the reviewer, each sentiment group consisting of one or more portions of the initial feedback text data associated with a common sentiment;
select at least one feedback processing module based on the one or more portions of the initial feedback text data corresponding to the sentiment group, the at least one feedback processing module comprising at least one machine-learned model;
for each sentiment group, apply the at least one machine-learned model of the selected at least one feedback processing module to the corresponding one or more portions of the initial feedback text data submitted by the reviewer to determine at least one suggested revision for the portion of the initial feedback text data submitted by the reviewer; and
generate revised feedback text data indicating each suggested revision for the initial feedback text data submitted by the reviewer.

2. The method of claim 1, wherein operating the at least one processor to identify the plurality of sentiment groups comprises operating the at least one processor to identify a plurality of emotionally charged words in the initial feedback text data submitted by the reviewer, and wherein at least one sentiment group includes a portion of the initial feedback text data corresponding to at least one of the emotionally charged words.

3. The method of claim 1 comprises operating the at least one processor to, for each sentiment group:
determine an emotional polarity associated with the corresponding one or more portions of the initial feedback text data submitted by the reviewer; and
determine the at least one suggested revision based on the associated emotion.

4. The method of claim 3, wherein operating the at least one processor to determine the emotional polarity associated with the corresponding one or more portions of the initial feedback text data submitted by the reviewer comprises operating the at least one processor to:
identify, in the corresponding one or more portions of the initial feedback text data submitted by the reviewer, at least one of: capitalization, punctuation, or emotionally charged words.

5. The method of claim 1 comprises operating the at least one processor to, for each sentiment group:
determine a specificity of the corresponding one or more portions of the initial feedback text data submitted by reviewer; and
determine the at least one suggested revision based on the specificity.

6. The method of claim 1, further comprising operating the at least one processor to determine an effectiveness of the revised feedback text data.

7. The method of claim 1 comprises operating the at least one processor to:
retrieve previous feedback text data for the learner based on an effectiveness of the previous feedback text data; and
determine the at least one suggested revision is based on the previous feedback text data.

8. The method of claim 1 comprises operating the at least one processor to:
retrieve previous feedback text data submitted by the reviewer based on an effectiveness of the previous feedback text data; and
determine the at least one suggested revision is based on the previous feedback text data.

9. The method of claim 1 comprises operating the at least one processor to:
determine the at least one suggested revision based on the evaluative submission.

10. The method of claim 1, wherein operating the at least one processor to receive the initial feedback text data submitted by the reviewer comprises receiving initial feedback audio data and convert the initial feedback audio data to the initial feedback text data.

11. A system for automatically revising feedback in an electronic learning system, the system comprising:
   at least one processor coupled to a communication interface, the at least one processor operable to:
      receive, from a computing device associated with a reviewer, initial feedback text data submitted by the reviewer to evaluate electronic input submitted by a learner, the reviewer and the learner being users of the electronic learning system, the electronic input comprising an evaluative submission;
      divide the initial feedback text data submitted by the reviewer into a plurality of portions;
      detect a sentiment associated with each portion of the initial feedback text data submitted by the reviewer;
      identify a plurality of sentiment groups in the initial feedback text data submitted by the reviewer, each sentiment group consisting of one or more portions of the initial feedback text data associated with a common sentiment;
      select at least one feedback processing module based on the one or more portions of the initial feedback text data corresponding to the sentiment group, the at least one feedback processing module comprising at least one machine-learned model;
      for each sentiment group, apply the at least one machine-learned model of the at least one feedback processing module to the corresponding one or more portions of the initial feedback text data submitted by the reviewer to determine at least one suggested revision for the portion of the initial feedback text data submitted by the reviewer; and
      generate revised feedback text data indicating each suggested revision for the initial feedback text data submitted by the reviewer.

12. The system of claim 11, wherein the initial feedback text data is received concurrently with the reviewer submitting a feedback submission to the electronic learning system, and the initial feedback text data includes at least a portion of the feedback submission.

13. The system of claim 11, wherein the initial feedback text data is received from the computing device associated with the reviewer in response to a prompt displayed at the computing device.

14. The system of claim 11, wherein at least two sentiment groups in the plurality of sentiment groups include a common portion of the initial feedback text data.

15. The system of claim 11, wherein at least one sentiment group includes adjacent sentences in the initial feedback text data submitted by the reviewer.

16. The system of claim 11, wherein the at least one processor being operable to identify the plurality of sentiment groups comprises the at least one processor being operable to identify a plurality of emotionally charged words in the initial feedback text data submitted by the reviewer, and wherein at least one sentiment group includes a portion of the initial feedback text data corresponding to at least one of the emotionally charged words.

17. The system of claim 11, wherein the at least one processor is operable to:
   determine an emotion associated with the corresponding one or more portions of the initial feedback text data submitted by the reviewer; and
   determine the at least one suggested revision based on the associated emotion.

18. The system of claim 11, wherein the at least one processor is operable to:
   determine a specificity of the corresponding one or more portions of the initial feedback text data submitted by the reviewer; and
   determine the at least one suggested revision based on the specificity.

19. The system of claim 11, wherein the at least one suggested revision is determined based on a reading complexity level of the learner.

20. The system of claim 11, wherein the at least one suggested revision is determined based on a psychological profile of the learner.

* * * * *